(12) United States Patent  
Jeong

(10) Patent No.: US 6,750,893 B2
(45) Date of Patent: Jun. 15, 2004

(54) IMAGE FORMING APPARATUS AND METHOD CONTROLLING A LASER SCAN UNIT

(75) Inventor: Su-jong Jeong, Gyunggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/156,023

(22) Filed: May 29, 2002

(65) Prior Publication Data

US 2003/0030716 A1 Feb. 13, 2003

(30) Foreign Application Priority Data

Aug. 8, 2001 (KR) .......................... 2001-47787

(51) Int. Cl.[7] .................. B41J 2/385; G03G 13/04; G03G 15/00; G03G 15/043
(52) U.S. Cl. ................ 347/133; 399/44; 399/51
(58) Field of Search ................. 347/132, 133, 347/140; 399/44, 66, 53, 55, 51

(56) References Cited

U.S. PATENT DOCUMENTS 5,521,683 A * 5/1996 Miyamoto et al. ............ 399/55
6,021,284 A * 2/2000 Serizawa et al. ............. 399/8

FOREIGN PATENT DOCUMENTS

JP 10-207262 A * 8/1998
JP 2001-100469 A * 4/2001

* cited by examiner

Primary Examiner—Susan Lee
(74) Attorney, Agent, or Firm—Staas & Halsey LLP

(57) ABSTRACT

An image forming apparatus compensating for printing density of a toner image by adjusting a quantity of light to form the toner image in accordance with a variation of a resistance of a roller includes an electrical charge roller electrically charging a photosensitive drum, a laser scan unit projecting the image light on the photosensitive drum to form an electrostatic latent image corresponding to an input image, a development roller developing the electrostatic latent image formed on the photosensitive drum with toner to form the toner image, a transfer roller rotating in contact with the photosensitive drum and transferring the toner image to a sheet of paper when a predetermined voltage is supplied to the transfer roller, and a controller controlling the laser scan unit and varying the quantity of the image light projected from the laser scan unit in accordance with the variation of a resistance value of the transfer roller.

39 Claims, 4 Drawing Sheets

FIG.3

| RESISTANCE VALUE OF TRANSFER ROLLER | WORK ENVIRONMENT | ADJUSTMENTS MADE TO QUANTITY OF IMAGE LIGHT PROJECTED FROM LASER SCAN UNIT | |
|---|---|---|---|
| $Rt > 500M\Omega$ | LOW TEMPERATURE /HUMIDITY | LIGHT QUANTITY INCREASE | LASER DIODE POWER INCREASE |
| | | | PROJECTION WIDTH OF IMAGE LIGHT INCREASE |
| $500M \geq Rt > 100M\Omega$ | APPROPRIATE ENVIRONMENT | LIGHT QUANTITY CORRESPONDING TO RECEIVED IMAGE DATA | |
| $Rt \leq 100M\Omega$ | HIGH TEMPERATURE /HUMIDITY | LIGHT QUANTITY DECREASE | LASER DIODE POWER DECREASE |
| | | | PROJECTION WIDTH OF IMAGE LIGHT DECREASE |

IMAGE FORMING APPARATUS AND METHOD CONTROLLING A LASER SCAN UNIT

CROSS-REFERENCE TO RELATED APPLICATIONS

This application claims the benefit of Korean No. 2001-47787, filed Aug. 8, 2001, in the Korean Industrial Property office, the disclosure of which is incorporated herein by reference.

BACKGROUND OF THE INVENTION

1. Field of the Invention

The present invention relates to an image forming apparatus and method in a laser printer or a photocopying machine, which uses an electrophotographing method, and more particularly, to an image forming apparatus for and method of preventing an image defect, checking a resistance of an image forming roller representing a work environment at a non-image interval and adjusting a quantity of an image light in accordance with the resistance of the image forming roller.

2. Description of the Related Art

Generally, a facsimile, a printer, a photocopying machine or a multi-purpose machine having all functions of the aforementioned three machines through a single apparatus is manufactured commonly to have a printing function. Accordingly, the machines comprise an image forming apparatus for the printing function.

The image forming apparatus is provided with a paper cassette on which a recording medium, e.g., printing paper is stacked. The image forming apparatus picks up and transfers each sheet of printing paper stacked on the paper cassette, and forms visible image on the printing paper transferred in an image forming portion by using toner. Then, the printing paper is discharged after the visible image is formed on the printing paper.

When the image forming apparatus is supplied with power, the image forming apparatus warms up for a predetermined time that is set in accordance with characteristics thereof. When the warming up is completed, the image forming apparatus is in an on-line mode to perform a printing command. If there is no printing command for a predetermined time after the apparatus is in the on-line mode, the image forming apparatus returns to an off-line mode. If the printing command is received in the off-line mode, the image forming apparatus performs a printing operation via the process of warming up. At this point, when the image forming apparatus is supplied with the power or warms up after receiving the printing command in the off-line mode, rollers of a printer engine, which substantially perform the printing operation, are preheated when a predetermined voltage is supplied to the rollers.

However, since each roller of the printer engine is made of conductive rubber material, a resistance of the roller varies according to a work environment of the image forming apparatus. In other words, the resistance of the roller is in inverse proportion to a temperature. Therefore, the resistance of the roller increases when an ambient temperature and humidity of the image forming apparatus are low, and decreases when the ambient temperature and the humidity are high.

The image forming apparatus forms the visible image by depositing the toner on an electrostatic latent image formed in accordance with externally received printing information and transfers the visible image to the printing paper. The roller transfers the visible image to the printing paper by an electric potential difference. At this point, if the resistance of each roller increases, the amount of the toner deposited on the electrostatic latent image is reduced, thereby causing a problem of low density of the visible image. Also, if the resistance of each roller decreases, an amount of the toner deposited on the electrostatic latent image to form the visible image increases, thereby causing a problem of high density of the visible image. Accordingly, there are several problems related to an image development, such as an image contamination of the non-image area, a transfer defect, etc. The problems become more serious in a mono development roller system or a high-speed development system.

Meanwhile, the above conventional image forming apparatus projects a certain quantity of image light in accordance with a predetermined value regardless of the work environment. Thus, there are problems in that the density of the visible image printed on the printing paper decreases when the resistance of the roller developing the visible image on the printing paper increases, and increases when the resistance of the roller decreases.

SUMMARY OF THE INVENTION

The object of the present invention to solve the above problems is to provide an image forming apparatus capable of preventing an image defect generated due to an increased or decreased resistance of each roller at a low ambient temperature and humidity or a high ambient temperature and humidity, by checking the resistance representing a work environment at non-image intervals, adjusting a quantity of image light in accordance with the work environment, and improving the quality of printing.

Additional objects and advantageous of the invention will be set forth in part in the description which follows and, in part, will be obvious from the description, or may be learned by practice of the invention.

The above and other objects are accomplished by an image forming apparatus according to the present invention, comprising an electrical charge roller for electrically charging a photosensitive drum, a laser scan unit projecting image light on the photosensitive drum to form an electrostatic latent image corresponding to an input image, a development roller developing the electrostatic latent image formed on the photosensitive drum with toner to form a toner image, a transfer roller rotating in contact with the photosensitive drum and transferring the toner image to a sheet of printing paper when a predetermined voltage is supplied, and a controller controlling the laser scan unit to vary a quantity of the image light projected from the laser scan unit in accordance with a variation of a resistance value of the transfer roller. The controller compensates for a variation of printing density to be compensated by an adjustment of the quantity of the image light projected from the laser scan unit according to the variation of the resistance value.

The controller calculates the resistance value based on a quantity of electricity between the transfer roller and the photosensitive drum. Also, the controller classifies the resistance value into one of a predetermined number of levels by a degree of the variation in the resistance value, and adjusts the quantity of the image light projected from the laser scan unit in accordance with the classified level. Meanwhile, the controller controls the quantity of the image light by adjusting an output level of the laser scan unit and a projection width of the image light.

Meanwhile, the above and other objects are accomplished by a method of controlling image forming operation of the image forming apparatus according to the present invention. The method includes calculating the resistance value of the transfer roller based on a quantity of electricity between the development roller and the photosensitive drum and compensating for the printing density by adjusting the quantity of image light projected from the laser scan unit in accordance with the calculated resistance value.

The method of controlling the image forming operation of the present invention further comprises classifying the calculated resistance value into one of the predetermined number of levels by the degree of the variation in the resistance value. Accordingly, the printing density is compensated for by adjusting the quantity of the image light projected from the laser scan unit in accordance with the classified level.

The printing density is compensated for by adjusting an output level from the image light projected from the laser scan unit and the projection width.

According to the present invention, prior to the printing of the input image, by calculating the resistance value of the transfer roller according to the printing work environment and adjusting the quantity of the image light projected from the laser scan unit in accordance with the variation of the calculated resistance value, a change of the printing density of the toner image printed on the printing paper can be compensated.

BRIEF DESCRIPTION OF THE DRAWINGS

These and other objects and advantageous of the present invention will become more apparent and more readily appreciated from the following description of the preferred embodiments, taken in conjunction with the accompanied drawings of which:

FIG. 3 is a table showing a determination of the printing work environment based on a calculated resistance value of a transfer roller, and an adjustment made to a quantity of image light projected from a laser scan unit in accordance with the determination of the printing work environment.

DETAILED DESCRIPTION OF THE PREFERRED EMBODIMENTS

Figure 1:
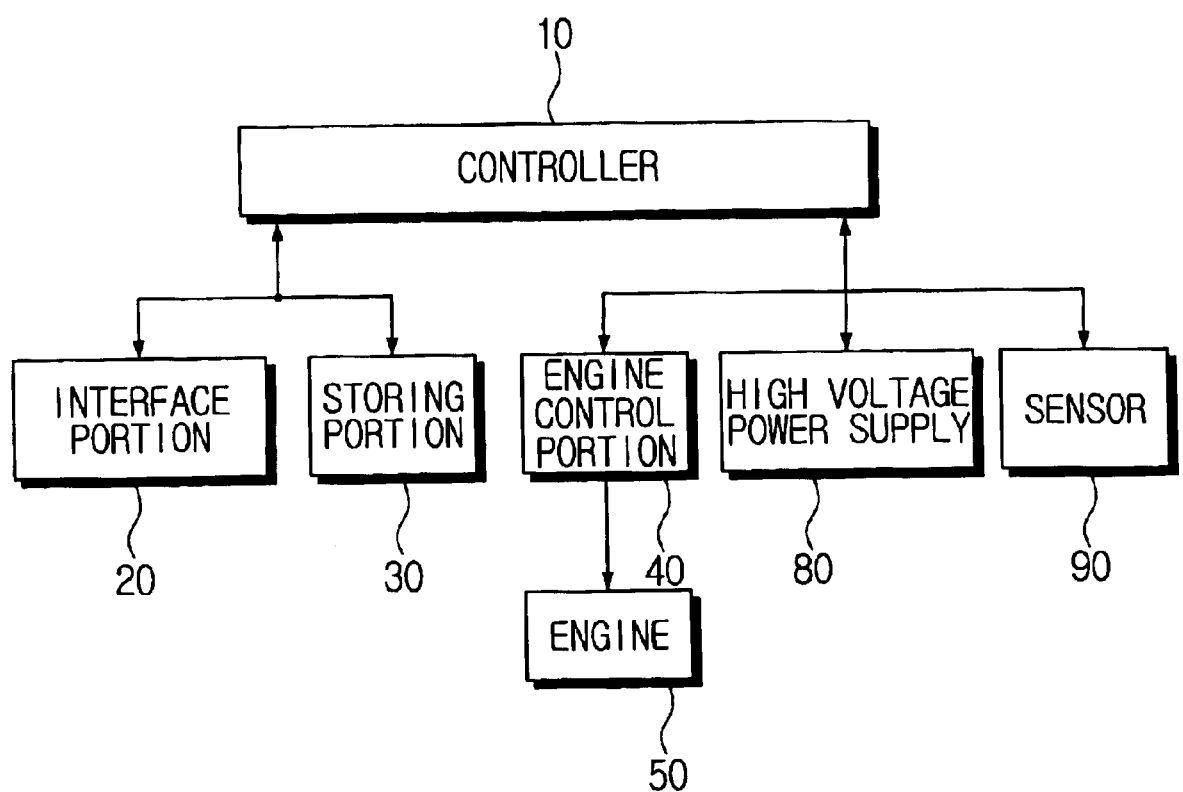
FIG. 1 is a schematic block diagram showing an image forming apparatus in accordance with an embodiment of the present invention.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, the present invention will be described in greater detail with reference to the accompanying drawings.

Figure 2:
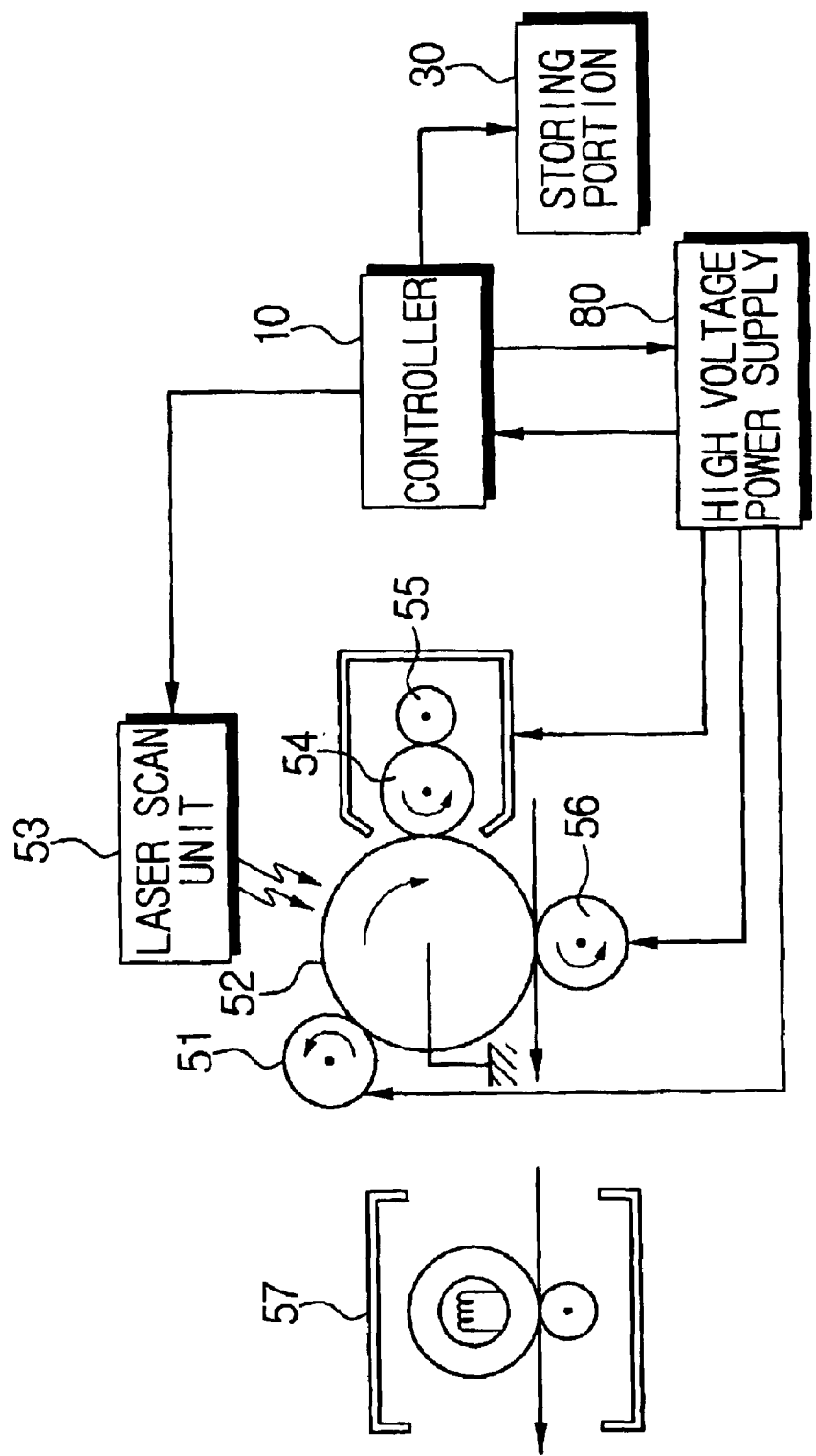
FIG. 2 is a schematic view showing the engine of FIG. 1.

FIG. 1 is a schematic block diagram showing an image forming apparatus in accordance with an embodiment of the present invention, and FIG. 2 is a schematic view illustrating a printer engine of FIG. 1.

As shown in FIG. 1, the image forming apparatus includes a controller 10 controlling a general printing operation of the image forming apparatus, an interface portion 20 receiving image data which is output from a computer, a storing portion 30 storing various control programs which are required to perform functions of the image forming apparatus and data which are generated during performing the functions of the control programs, a printer engine 50 performing a printing operation, an engine control portion 40 driving the printer engine 50 in accordance with the controller 10, a high voltage power supply 80 for supplying a predetermined voltage to each roller of the engine 50 in accordance with the controller 10, and a sensor 90 detecting errors, such as a paper jam in the printer engine 50 or an absence of the printing paper, which are generated during the printing operation.

As shown in FIG. 2, the printer engine 50 including an electrical charge roller 51, a photosensitive drum 52, a laser scan unit (LSU) 53, a development roller 54, a providing roller 55, a transfer roller 56, and a settler 57 prints a visible image corresponding to the image data on printing paper. The development roller 54 and the providing roller 55 form a toner supplying roller unit to supply the toner to the photosensitive drum 52.

An operation of the printer engine 50 having the above construction will be described below. In accordance with the controller 10, the high voltage power supply 80 supplies predetermined voltages to each roller 51, 54, 55, 56, and 57 of the printer engine 50. Generally, the high voltage power supply 80 respectively provides the electrical charge roller 51 with an electrical charge voltage of −1.4 KV, the transfer roller 56 with a transfer voltage of +2.0 KV, the development roller 54 with a development voltage of −300 V, and the providing roller 55 with a providing voltage of −500 V.

Accordingly, the electrical charge roller 51, which is electrically charged by the high electrical charge voltage, is rotated in association with the photosensitive drum 52 to electrically charge a photosensitive material evenly formed around an outer circumference of the photosensitive drum 52. At this point, the laser scan unit 53 receives a control signal from the controller 10. The control signal allows image light of the laser scan unit 53, which corresponds to the image data inputted from the controller 10, to be projected on the photosensitive drum 52. Therefore, the laser scan unit 53 projects the image light corresponding to the received control signal on the photosensitive drum 52 when a laser diode LD (not shown) disposed in the laser scan unit 53 is on.

By the image light projected from the laser scan unit 53, an electrostatic latent image of the printing image is formed on a surface of the photosensitive drum 52. Meanwhile, there is an electric potential difference between the providing voltage of the providing roller 55 and the development voltage of the development roller 54. Accordingly, toner having a negative charge moves from the providing roller 55 to the development roller 54. The toner transferred to the development roller 54 is deposited on the electrostatic latent image formed on a surface of the photosensitive drum 52 to form the visible image.

The transfer roller 56 with the high transfer voltage supplied from the high voltage power supply 80 transfers the visible image, which is formed by depositing the toner on the electrostatic latent image formed on the surface of the photosensitive drum 52, to the printing paper. The visible image transferred to the printing paper is fixed on the printing paper by a high temperature and a pressure of the settler 57, and the printing operation is finished.

Meanwhile, according to the embodiment of the present invention, the controller 10 calculates a resistance value Rt of the transfer roller 56 and adjusts the quantity of the image light projected from the laser scan unit 53 in accordance with the calculated resistance value prior to the driving of the laser scan unit 53 projecting the image light corresponding to the image data. At this point, the calculation of the resistance value Rt is achieved by dividing a voltage value Vt provided to the transfer roller 56 by a current value It which is output from the transfer roller 56 to the photosensitive drum 52, with the following formula:

$$Rt = \frac{Vt}{It}$$

where, Rt is the resistance value, Vt is the voltage value provided to the transfer roller, and It is the current value.

The resistance value Rt varies according to the printing work environment, such as an ambient temperature and humidity. Meanwhile, the controller 10 classifies the resistance value Rt into one of a predetermined number of levels in accordance with a range of the variation of the resistance value. In accordance with the classified level, the controller 10 adjusts the quantity of the image light projected from the laser scan unit 53.

FIG. 3 is a table showing a determination of the printing work environment based on the calculated resistance value Rt of the transfer roller 56, and an adjustment made to the quantity of the image light projected from the laser scan unit 53 in accordance with the determination of the printing work environment. As shown in FIG. 3, if the resistance value Rt of the transfer roller 56 is somewhere between 500 MΩ and 100 MΩ, the printing work environment is determined to be appropriate for the printing operation. If the resistance value Rt exceeds 500 MΩ, the resistance value Rt is determined to be high, and if the resistance value (Rt) is below 100 MΩ, the resistance value Rt is determined to be low. If the resistance value Rt is high, the controller 10 determines that the ambient temperature and the humidity are low and accordingly increases the quantity of the image light projected from the laser scan unit 53 in order to solve a problem of low printing density which is caused due to the low temperature and humidity. The quantity of the image light projected from the laser scan unit 53 increases as power of the laser diode used for emitting the image light is increased such that the output level of the image light projected into the photosensitive drum 52 is increased. Also, the controller 10 extends a projection width of the image light projected on the photosensitive drum 52 in order to increase the quantity of the image light projected from the laser scan unit 53.

Meanwhile, if the resistance value Rt of the transfer roller 56 is somewhere between 500 MΩ and 100 MΩ, the controller 10 determines the printing work environment appropriate for the printing operation and then allows the laser scan unit 53 to project the image light according to the input image data. Thus, a latent image identical to the received image data is formed on the photosensitive drum 52.

Also, if the resistance value Rt of the transfer roller 56 is low, the controller 10 determines that the ambient temperature and the humidity are high and accordingly decreases the quantity of the image light projected from the laser scan unit 53 in order to solve a problem of high printing density which is caused due to the high ambient temperature and the humidity. The quantity of the image light projected from the laser scan unit 53 decreases, as the power of the laser diode emitting the image light is decreased such that the output level of the image light projected on the photosensitive drum 52 is decreased. Also, the controller 10 may reduce the projection width of the image light projected on the photosensitive drum 52 in order to decrease the quantity of the image light projected from the laser scan unit 53.

Meanwhile, each adjustment of the quantity of the image light projected from the laser scan unit 53 according to the calculated resistance value Rt of the transfer roller 56 is stored in the storing portion 30 in the form of a table. Accordingly, the controller 10 controls the projecting operation of the laser scan unit 53 according to the stored information on the adjustments to the quantity of the image light projected from the laser scan unit 53 according to the calculated resistance value Rt of the transfer roller 56.

Therefore, the image forming apparatus can compensate for the image defect by adjusting the quantity of the image light projected from the laser scan unit 53 according to the printing work environment.

Figure 4:
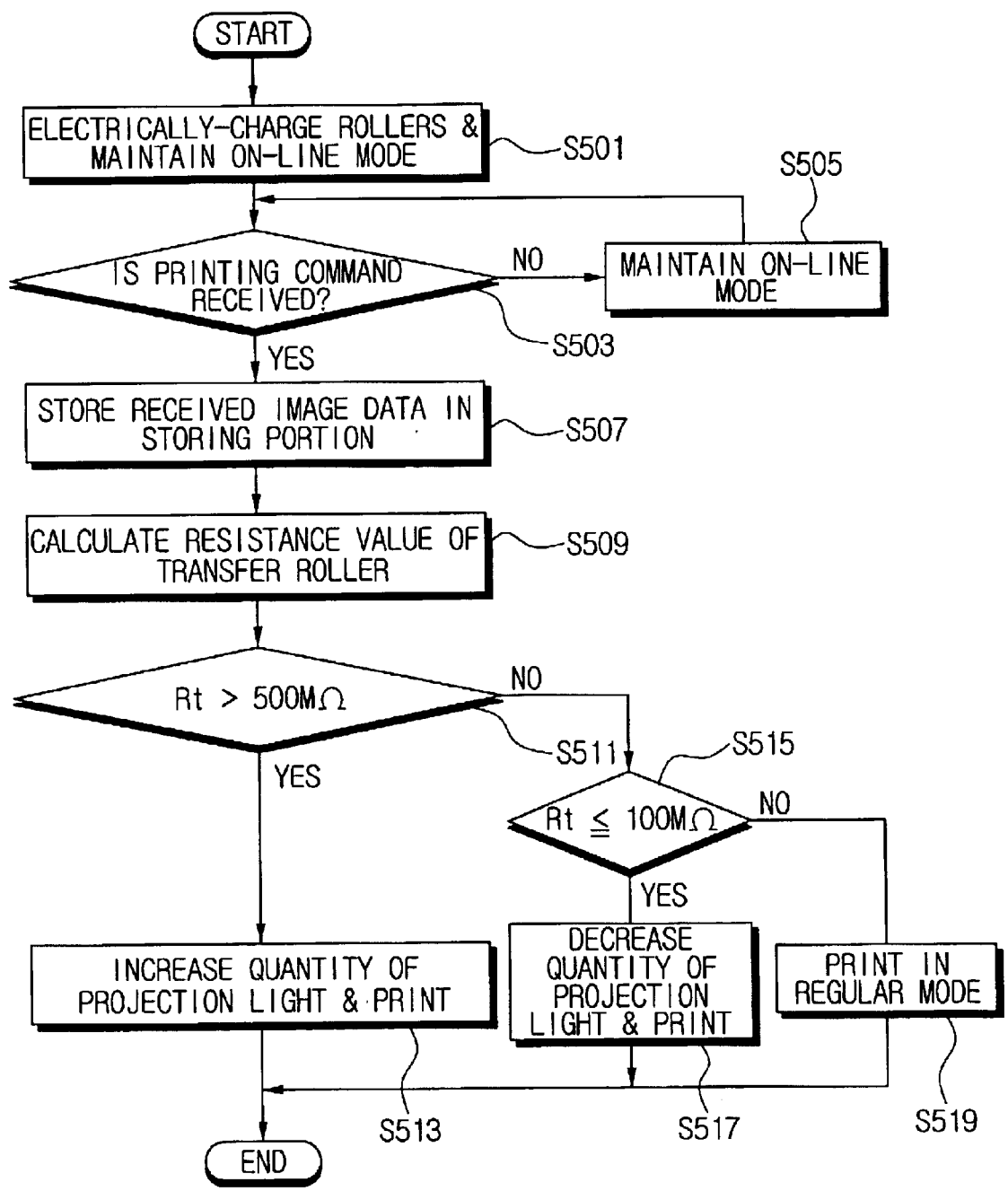
FIG. 4 is a flowchart showing a method of controlling an image forming operation in accordance with the determination and the adjustment of FIG. 3.

FIG. 4 is a flowchart showing a method of controlling an image forming operation of the image forming apparatus of FIGS. 1 and 2. When the power is supplied to the image forming apparatus by manipulation of a power switch (not shown), the controller 10 controls the high voltage power supply 80 to electrically charge the each roller 51, 54, 55, 56 with respective predetermined voltages and maintains the on-line mode for the printing operation after a predetermined warm-up time in operation S501. In the on-line mode, the controller 10 determines whether a printing command is received from the computer in operation of S503. If it is determined that the printing command is not received in operation S503, the controller 10 maintains the image forming apparatus on the on-line mode in operation S505. Meanwhile, if it is determined that the printing command is received in the S503, the controller 10 stores the received image data in the storing portion 30 in operation S507.

Meanwhile, the controller 10 calculates the resistance value Rt of the transfer roller 56 at a non-image interval in operation S509. The non-image interval is an interval from the receipt of the printing command until the printing operation when the image forming apparatus is in the on-line mode.

The controller 10 determines whether the resistance value Rt of the transfer roller 56 calculated in S509 exceeds 500 MΩ in operation S511. If it is determined that the resistance value Rt of the transfer roller 56 exceeds 500 MΩ in operation S511, the controller 10 increases the quantity of the image light projected from the laser scan unit 53 and then performs the printing operation in operation S513. If it is determined that the resistance value Rt of the transfer roller 56 does not exceed 500 MΩ in S511, the controller 10 determines whether the resistance value Rt of the transfer roller 56 is less than 100 MΩ in operation S515. If it is determined that the resistance value Rt of the transfer roller 56 is less than 100 MΩ in operation S515, the controller 10 decreases the quantity of the image light projected from the laser scan unit 53 and then performs the printing operation of the image forming apparatus in operation S517. Meanwhile, if it is determined that the resistance value Rt of the transfer roller 56 is not less than 100 MΩ in operation S515, the controller 10 performs the printing operation with the quantity of the image light projected from the laser scan unit 53 on a regular mode in operation S519.

Accordingly, the image forming apparatus can compensate for the image defect, which is caused by the printing work environment of the transfer roller 56, by adjusting the quantity of the image light projected from the laser scan unit 53 in accordance with the resistance value Rt of the transfer roller 56.

According to the present invention, prior to the printing of the input image data, by calculating the resistance value Rt of the transfer roller 56 according to the printing work environment and adjusting the quantity of the image light projected from the laser scan unit 53 in accordance with the variation of the calculated resistance value, a change of printing density of the visible image caused by the variation of the ambient temperature can be compensated.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. An image forming apparatus, comprising:

a photosensitive drum;

an electrical charge roller electrically charging the photosensitive drum;

a laser scan unit projecting image light on the photosensitive drum to form an electrostatic latent image;

a development roller developing the electrostatic latent image formed on the photosensitive drum with toner to form a visible image;

a transfer roller rotating in contact with the photosensitive drum and transferring the toner image to a sheet of printing paper when a predetermined voltage is supplied to the transfer roller; and a controller detecting a resistance value of the transfer roller and controlling the laser scan unit to adjust a quantity of the image light projected from the laser scan unit in accordance with a variation of the resistance value of the transfer roller, wherein the controller compensates for a variation of printing density of the visible image by adjusting the quantity of the image light according to the variation of the resistance value, wherein the controller controls the quantity of the projected image light by adjusting a projection width of the image light of the laser scan unit.

2. The image forming apparatus of claim 1, wherein the controller calculates the resistance value based on a quantity of current between the transfer roller and the photosensitive drum.

3. The image forming apparatus of claim 1, wherein the resistance value is classified into one of a predetermined number of levels by a range of the variation of the resistance value, and the controller adjusts the quantity of the image light projected from the laser scan unit in accordance with the classified level.

4. The image forming apparatus of claim 1, wherein the controller controls the quantity of the projected image light by adjusting an output level of the laser scan unit.

5. A method of controlling an image forming operation of an image forming apparatus which comprises a photosensitive drum, an electrical charge roller electrically charging the photosensitive drum, a laser scan unit projecting image light on the photosensitive drum to form an electrostatic latent image, a development roller developing the electrostatic latent image formed on the photosensitive drum with toner to form a toner image, and a transfer roller rotating in contact with the photosensitive drum and transferring the toner image to a sheet of printing paper when a predetermined voltage is supplied to the transfer roller, the method comprising:

calculating a resistance value of the transfer roller based on a quantity of current between the development roller and the photosensitive drum; and adjusting a quantity of image light projected from the laser scan unit in accordance with the calculated resistance value.

6. The method of claim 5, further comprising classifying the calculated resistance value into one of a predetermined number of levels depending upon a range of a variation in the resistance value, wherein the quantity of the image light is adjusted in accordance with the classified level.

7. The method of claim 5, wherein the adjusting of the quantity of image light comprises:

adjusting an output level of the image light to compensate for printing density of the toner image.

8. The method of claim 5, further comprising:

adjusting a projection width of the image light projected from the laser scan unit to compensate for printing density of the toner image.

9. An image forming apparatus, comprising:

a laser scan unit generating image light forming a latent image;

a power generator supplying a predetermined voltage;

a roller unit forming an image corresponding to the latent image; and a controller calculating a resistance value of the roller unit when the predetermined voltage is supplied to the roller unit, and controlling the laser scan unit to adjust a quantity of the image light in response to the resistance value.

10. The apparatus of claim 9, wherein the controller detects the resistance value during a non-image forming interval before the laser scan unit emits the image light.

11. The apparatus of claim 9, wherein the resistance value is calculated based upon the predetermined voltage and a current detected from the roller unit when the predetermined voltage is supplied to the roller unit.

12. The apparatus of claim 9, wherein the roller unit comprises a first roller and second roller, the first roller being supplied with the predetermined voltage while the second roller is supplied with a supplying voltage lower than the predetermined voltage, the resistance value calculated based upon the predetermined voltage and a current detected from an electrical circuit formed by both the first and second rollers.

13. The apparatus of claim 9, wherein the roller unit comprises:

a photosensitive drum receiving the image light to form the latent image;

a providing roller supplying toner;

a developing roller transferring the toner from the providing roller to the photosensitive drum to form the image; and a transfer roller transferring the image from the photosensitive roller to a recording medium, the transfer roller being supplied with the predetermined voltage;

wherein the providing roller and the developing roller are supplied with a providing voltage and a developing voltage generated from the power generator, respectively, and electrically coupled to the photosensitive drum and the transfer roller.

14. The apparatus of claim 13, wherein the controller calculates the resistance value based on the predetermined voltage and a current detected from an electrical circuit formed by the transfer roller, the photosensitive roller, the providing roller, and the developing roller.

15. The apparatus of claim 9, further comprising a memory storing a lookup table, wherein the lookup table includes a plurality of determinations each representing respective work environments of the roller unit in response to the resistance value and a plurality of adjustments each adjusting the quantity of the image light in response to respective ones of the determinations.

16. The apparatus of claim 15, wherein the controller determines one of the determinations in accordance with the resistance value, selects one of the adjustments in accordance with the one determination, and adjusts the quantity of the image light of the laser scan unit in accordance with the one adjustment.

17. The apparatus of claim 9, wherein the controller increases the quantity of the image light when the resistance value is greater than a first reference value and decreases the quantity of the image light when the resistance value is less than a second reference value.

18. The apparatus of claim 17, wherein the quantity of the image light is not changed when the resistance value is between the first and second reference values.

19. The apparatus of claim 17, wherein a difference between the first and second reference values is about 400 MΩ.

20. The apparatus of claim 17, further comprising a memory storing the first reference value, the second reference value, and the resistance value.

21. The apparatus of claim 9, wherein the controller decreases the quantity of the image light when the resistance value of the roller unit is lower than about 100 MΩ in response to the predetermined voltage of 2,000 volts.

22. The apparatus of claim 9, wherein the controller increases the quantity of the image light when the resistance of the roller unit is higher than about 500 MΩ in response to the predetermined voltage of 2,000 Volts.

23. The apparatus of claim 9, wherein the controller controls the laser scan unit to adjust a width of the image light emitted by the laser scan unit.

24. The apparatus of claim 9, wherein the width of the image light is widened or narrowed in response to the resistance.

25. The apparatus of claim 9, wherein the roller unit comprises a photosensitive drum receiving the image light and a transfer roller transferring the image formed on the photosensitive drum to a printing medium, wherein the resistance value is based on a quantity of electricity between the transfer roller and the photosensitive drum.

26. The apparatus of claim 9, wherein the controller controls image density of the image by adjusting the image light.

27. The apparatus of claim 9, wherein the controller compensates for an image defect caused by a variation of the image light by adjusting the quantity of the image light when an ambient temperature of the image forming apparatus is lower or higher than a predetermined reference range.

28. An image forming apparatus, comprising:
a laser scan unit emitting first image light and second image light;
a power generator generating a predetermined voltage;
a roller unit forming an image in response to the image light; and
a controller receiving a print command from an external input device, detecting a current calculating a resistance value from the roller unit supplied with based on the predetermined voltage and the current value in response to the print command, controlling the laser scan unit to emit one of the first and second image light in response to the detected current in accordance with the calculated resistance value.

29. The apparatus of claim 28, wherein the controller is in one of an on-line mode and an off-line mode, the controller controlling the power generator and the roller unit when the controller receives the print command in the on-line mode.

30. The apparatus of claim 29, wherein the controller controls the power generator to supply the roller unit with the predetermined voltage when the print command is received.

31. The apparatus of claim 29, wherein the controller detects the current during a non-image forming interval between when the predetermined voltage is supplied to the roller unit and when the one of the first and second image light is emitted from the laser scan unit in response to the print command.

32. An image forming apparatus comprising:
a laser scan unit emitting first image light and second image light;
a power generator generating a predetermined voltage;
a roller unit forming an image in response to the image light; and
a controller receiving a print command from an external input device, detecting a current value from the roller unit supplied with the predetermined voltage in response to the print command, controlling the laser scan unit to emit one of the first and second image light in response to the detected current,
wherein the roller unit comprises:
a photosensitive drum receiving the image light to form a latent image,
a toner supplying roller receiving a supplying voltage from the power generator and supplying toner to the photosensitive drum to form the image corresponding to the latent image on the photosensitive drum, and
a transfer roller transferring the image from the photosensitive drum to a recording medium.

33. The apparatus of claim 32, further comprising a circuit formed by the transfer roller, the photosensitive drum, and the toner supplying roller, wherein the controller detects the current value from the circuit in response to the predetermined voltage and the supplying voltage.

34. A method in an image forming apparatus, comprising:
receiving a print command and image data;
supplying a plurality of voltages to a roller unit having a transfer roller, a toner supplying roller, and an electrical charge roller, respectively, in response to the print command;
detecting a current value from the roller unit when the voltages are supplied to the roller unit; and
controlling a laser scan unit to emit image light corresponding to the image data to form an image in accordance with the current value.

35. The method of claim 34, wherein the current value is detected during a non-image forming period between when the print command is received and when the image light is emitted from the laser scan unit in response to the print command and the image data.

36. The method of claim 34, further comprising calculating a resistance value based upon the voltages and the current.

37. The method of claim 36, further comprising storing a lookup table, wherein the lookup table includes a plurality of determinations each representing respective work environments of the roller unit in response to the resistance value and a plurality of adjustments each adjusting the quantity of the image light in response to respective determinations.

38. The method of claim 37, wherein the controller determines one of the determinations in accordance with the resistance value, selects one of the adjustments in accordance with the one of the determinations, and adjusts a quantity of the image light of the laser scan unit in accordance with the one determination.

39. The method of claim 34, further comprising:
making a comparison between the current and a reference value; and
controlling the laser scan unit to emit one of a first quantity of the image light and a second quantity of the image light in response to the comparison wherein the first quantity of the image light is different from the second quantity of the image light.

* * * * *